United States Patent
Kammerer et al.

(10) Patent No.: US 11,557,900 B2
(45) Date of Patent: Jan. 17, 2023

(54) SYSTEMS CONTAINING A DOUBLE FED INDUCTION MACHINE AND A FLY WHEEL, AND METHODS OF OPERATING SUCH SYSTEMS

(71) Applicant: SIEMENS AKTIENGESELLSCHAFT, Munich (DE)

(72) Inventors: Felix Kammerer, Erlangen (DE); Jens Rosendahl, Hamm (DE); Kunal Sharma, Erlangen (DE); Nicol Hildebrand, Dresden (DE); Wilfried Hofmann, Dresden (DE); Martin Leubner, Dresden (DE); Nico Remus, Dresden (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 17/366,706

(22) Filed: Jul. 2, 2021

(65) Prior Publication Data
US 2022/0014024 A1  Jan. 13, 2022

(30) Foreign Application Priority Data
Jul. 8, 2020 (EP) .................... 20184619

(51) Int. Cl.
*H02J 3/30* (2006.01)
*H02P 21/22* (2016.01)
(Continued)

(52) U.S. Cl.
CPC ............. *H02J 3/30* (2013.01); *H02J 3/1885* (2013.01); *H02K 7/025* (2013.01); *H02P 21/14* (2013.01); *H02P 21/22* (2016.02); *H02P 27/04* (2013.01)

(58) Field of Classification Search
CPC . H02J 3/30; H02J 3/1885; H02P 21/14; H02P 21/22; H02P 27/04; H02P 9/10;
(Continued)

(56) References Cited

U.S. PATENT DOCUMENTS

2009/0278351 A1* 11/2009 Rivas ............... F03D 7/0224
290/44
2010/0114388 A1* 5/2010 Ooi .................. H02P 21/14
700/287

(Continued)

FOREIGN PATENT DOCUMENTS

| CN | 106410844 B | 5/2019 |
| DE | 102018204787 A1 | 10/2019 |
| EP | 2677168 A1 | 12/2013 |

OTHER PUBLICATIONS

Kammerer Felix: "Systemanalyse und Regelung des Modularen Multilevel Matrix Umrichters als Antriebsumrichter", [System analysis and control of the modular multilevel matrix convereter as a drive converter], Dissertation Karlsruher Institut für Technologie (KIT), Feb. 11, 2016—English abstract.

(Continued)

*Primary Examiner* — Bickey Dhakal
(74) *Attorney, Agent, or Firm* — Laurence A. Greenberg; Werner H. Stemer; Ralph E. Locher

(57) ABSTRACT

A system contains a double fed induction machine having a stator and a rotor, a fly wheel coupled to the rotor, and a control device for providing a rotor voltage and a rotor current to the rotor. The control device is connected to the rotor and the stator and is capable of generating the rotor voltage and rotor current in response to an electrical signal that is applied to the stator. The control device has a multilevel converter and a control unit for controlling the multilevel converter.

12 Claims, 4 Drawing Sheets

(51) Int. Cl.
  *H02J 3/18* (2006.01)
  *H02P 21/14* (2016.01)
  *H02P 27/04* (2016.01)
  *H02K 7/02* (2006.01)

(58) Field of Classification Search
  CPC .............. H02P 9/102; H02P 2207/076; H02P 2207/00; H02P 2207/07; H02M 7/00; H02M 7/04
  See application file for complete search history.

(56) References Cited

U.S. PATENT DOCUMENTS

| | | |
|---|---|---|
| 2013/0328309 A1 | 12/2013 | Fujii et al. |
| 2019/0199255 A1* | 6/2019 | Hu .............................. H02J 3/18 |
| 2021/0028626 A1 | 1/2021 | Rosendahl et al. |

OTHER PUBLICATIONS

Marco Liserre et al: "Overview of Multi-MW Wind Turbines and Wind Parks", IEEE Transactions on Industrial Electronics, IEEE Service Center, Piscataway, NJ, USA, vol. 58, No. 4, Apr. 1, 2011 (Apr. 1, 2011), pp. 1081-1095, XP011350352, ISSN: 0278-0046, DOI: 10.1109/TIE.2010.2103910, * the whole document *.
Carlos Melendez et al: "Corrtrol of a Double Fed Induction Generator based Wind Energy Conversion System equipped with a Modular Multilevel Matrix Converter", 2019 Fourteenth International Conference on Ecological Vehicles and Renewable Energies (EVER), IEEE, May 8, 2019 (May 8, 2019), pp. 1-11, XP033606678, DOI: 10.1109/EVER.2019.8813552, [retrieved on Aug. 26, 2019], * the whole document *.

* cited by examiner

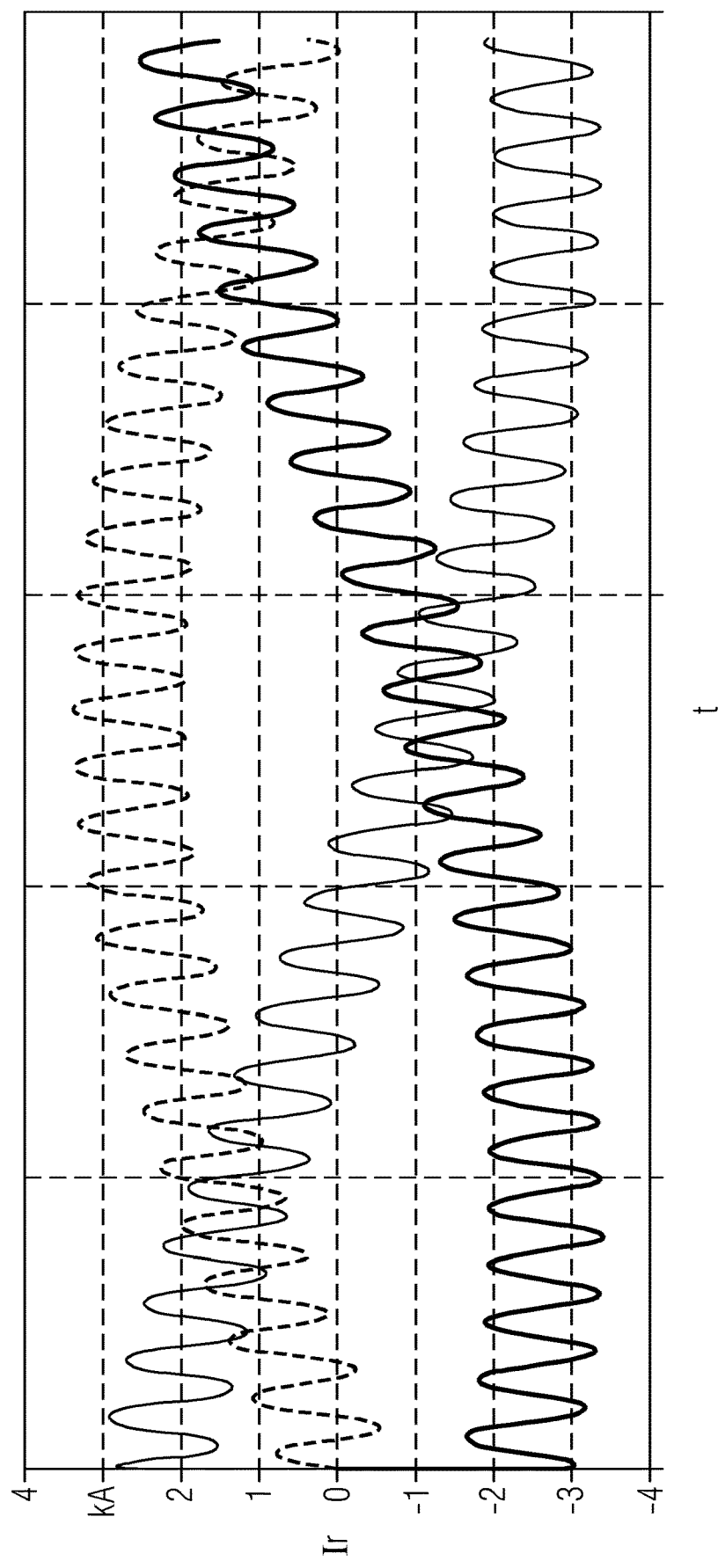

SYSTEMS CONTAINING A DOUBLE FED INDUCTION MACHINE AND A FLY WHEEL, AND METHODS OF OPERATING SUCH SYSTEMS

CROSS-REFERENCE TO RELATED APPLICATION

This application claims the priority, under 35 U.S.C. § 119, of European patent application EP 20184619.3, filed Jul. 8, 2020; the prior application is herewith incorporated by reference in its entirety.

The invention relates to systems that inter alia comprise a double fed induction machine and a fly wheel, as well as methods of operating such systems.

BACKGROUND OF THE INVENTION

Field of the Invention

Published, non-prosecuted German patent application DE 10 2018 204 787 A1, corresponding to U.S. patent publication No. 20210028626, discloses a system that contains a double fed induction machine. A fly wheel is coupled to the rotor of the machine. A control device provides a rotor voltage and a rotor current to the rotor. The control device is connected to the rotor and the stator and capable of generating the rotor voltage and rotor current in response to an electrical signal that is applied to the stator. The system allows providing active power in case of frequency changes in an electrical grid in order to reduce or minimize these frequency changes.

Methods of controlling multilevel converters in connection with electrical engines are described in the article entitled "Systemanalyse and Regelung des Modularen Multilevel Matrix Umrichters als Antriebsumrichter" (Kammerer, Felix, Dissertation, Karlsruhe, Karlsruher Institut für Technologie (KIT), 2016, Diss., 2016).

BRIEF SUMMARY OF THE INVENTION

An objective of the present invention is to provide a system and a method that are capable of stabilizing electrical grids, in particular in case of "Low-Voltage Ride Through" situations.

An exemplary embodiment of the present invention relates to a system containing a double fed induction machine having a stator and a rotor, a fly wheel coupled to the rotor, and a control device for providing a rotor voltage and a rotor current to the rotor. The control device is connected to the rotor and the stator and capable of generating the rotor voltage and rotor current in response to an electrical signal that is applied to the stator. According to the invention the control device contains a multilevel converter and a control unit for controlling the multilevel converter.

An advantage of the above embodiment of the invention is that it allows coping with failures in electrical grids, in particular in case of "Low-Voltage Ride Through" situations, in a fast and reliable way.

The multilevel converter is preferably a Matrix Multilevel Converter.

The control unit is preferably configured to calculate a first frequency as a function of the actual rotational velocity of the rotor.

The control unit is preferably configured to calculate a second frequency as a function of the first frequency and the frequency of the electrical signal that is applied to the stator.

The control unit may be configured to control the multilevel converter in order to apply a rotor voltage and a rotor current that each comprise both the first and second frequency, in order to counteract deviations between the actual stator current and a predefined stator current.

The control unit may calculate the first frequency by multiplying the actual rotational velocity of the rotor and the pole pair number of the machine. The second frequency may be calculated by subtracting the first frequency from the fundamental frequency of the electrical signal that is applied to the stator.

The stator is preferably connected to an energy supply grid.

A predefined stator current preferably corresponds to the stator current under normal grid conditions before a Low-Voltage Ride Through situation occurs. The control unit is preferably configured to control the rotor current in order to stabilize the grid in case of a Low-Voltage Ride Through situation by counteracting deviations between the actual stator current and the predefined stator current with respect to a first frequency and a second frequency. The first frequency is a function of the actual rotational velocity of the rotor and the pole pair number of the machine, and the second frequency is a function of the difference between the first frequency and the frequency of the grid.

The control unit preferably contains a transformation unit that is configured to receive measured stator phase current values and calculate a d-component and a q-component of the actual stator current in Park-coordinates, and to receive measured rotor phase current values and calculate a d-component and a q-component of the actual rotor current in Park-coordinates.

The control unit preferably contains an evaluation unit that is configured to generate d-components and q-components of a rotor current and a rotor voltage that are to be applied to the rotor, namely with respect to the first and second frequency and in response to a deviation between the d-component of the actual stator current and the corresponding d-component of a predefined stator current and the deviation between the q-component of the actual stator current and the corresponding q-component of a predefined stator current.

The evaluation unit may contain a first evaluation branch and a second evaluation branch. The first evaluation branch may be configured to generate the d-components of the rotor current and the rotor voltage that are to be applied to the rotor, in response to and in order to minimize a deviation between the d-component of the actual stator current and the d-component of the predefined stator current.

The second evaluation branch may be configured to generate the q-components of the rotor current and the rotor voltage that are to be applied to the rotor, in response to and in order to minimize a deviation between the q-component of the actual stator current and the q-component of the predefined stator current.

The first evaluation branch preferably contains a first d-subunit that is configured to generate the d-component of the rotor current that is to be applied to the rotor, in response to a deviation between the d-component of the actual stator current and the d-component of the predefined stator current with respect to the first frequency;

a second d-subunit that is configured to generate the d-component of the rotor current that is to be applied to the rotor, in response to a deviation between the d-component of the actual stator current and the d-component of the predefined stator current with respect to the second frequency;

a d-adder that adds the generated d-components of the first and second frequency and generates a d-component of a sum current;

a d-subtractor that is configured to subtract the d-component of the actual rotor current from the d-component of the sum current;

a third d-subunit that is configured to generate the d-component of the rotor voltage that is to be applied to the rotor, in response to the output of the d-subtractor with respect to the first frequency; and a fourth d-subunit that is configured to generate the d-component of the rotor voltage that is to be applied to the rotor, in response to the output of the d-subtractor with respect to the second frequency.

The second evaluation branch preferably contains a first q-subunit that is configured to generate the q-component of the rotor current that is to be applied to the rotor, in response to a deviation between the q-component of the actual stator current and the q-component of the predefined stator current with respect to the first frequency;

a second q-subunit that is configured to generate the q-component of the rotor current that is to be applied to the rotor, in response to a deviation between the q-component of the actual stator current and the q-component of the predefined stator current with respect to the second frequency;

a q-adder that adds the generated q-components of the first and second frequency and generates a q-component of a sum current;

a q-subtractor that is configured to subtract the q-component of the actual rotor current from the q-component of the sum current;

a third q-subunit that is configured to generate the q-component of the rotor voltage that is to be applied to the rotor, in response to the output of the q-subtractor with respect to the first frequency; and a fourth q-subunit that is configured to generate the q-component of the rotor voltage that is to be applied to the rotor, in response to the output of the q-subtractor with respect to the second frequency.

The first and third d-subunit are preferably resonant controllers.

The second and fourth d-subunit are preferably PI-controllers.

The first and third q-subunit are preferably resonant controllers.

The second and fourth q-subunit are preferably PI-controllers.

The first d-subunit and the first q-subunit are preferably identical resonant controllers.

The third d-subunit and the third q-subunit are preferably identical resonant controllers.

The second d-subunit and the second q-subunit are preferably identical PI controllers.

The fourth d-subunit and the fourth q-subunit are preferably identical PI controllers.

The control unit may comprise a transformation unit that is configured to receive the d-components and q-components of the rotor current and the rotor voltage that are to be applied to the rotor, and to generate corresponding α-components and β-components in Clarke-coordinates.

The control unit may comprise a converter unit that is configured to control the branch voltages of internal branches of the multilevel converter in response to α-components and β-components that define the rotor current and the rotor voltage that are to be applied to the rotor. The converter unit may be based on control algorithms that are disclosed in "Systemanalyse and Regelung des Modularen Multilevel Matrix Umrichters als Antriebsumrichter" (Kammerer, Felix, Dissertation, Karlsruhe, Karlsruher Institut für Technologie (KIT), 2016, Diss., 2016).

The above described embodiments may include a combination of the following features:

(1) transforming 3phase-based input signals into d- and q-coordinates by a first transformation unit, (2) generating control signals for the converter unit based on d- and q-coordinates as well as based on resonant controllers and PI controllers that are for instance incorporated in the evaluation unit described above, (3) transforming the control signals into α- and β-coordinates by a second transformation unit, and (4) controlling the converter unit based on the resulting control signals in α- and β-coordinates.

The latter combination of features results in a very efficient generation of control signals for the converter unit. More specifically, it allows using prior art converter units such as those described in "Systemanalyse and Regelung des Modularen Multilevel Matrix Umrichters als Antriebsumrichter" (Kammerer, Felix, Dissertation, Karlsruhe, Karlsruher Institut für Technologie (KIT), 2016, Diss., 2016) based on α- and β-coordinates. Further it allows using resonant controllers and PI controllers for generating the control signals for the converter unit very efficiently based on d- and q-coordinates.

Another exemplary embodiment of the present invention relates to a method of operating a system containing a double fed induction machine comprising a stator and a rotor, a fly wheel coupled to the rotor, and a control device for providing a rotor voltage and a rotor current to the rotor. The control device is "connected to the rotor and the stator and generates the rotor voltage and rotor current in response to an electrical signal that is applied to the stator. According to the invention, the control device contains a multilevel converter, and the multilevel converter is controlled by a control unit.

According to a preferred embodiment of the invention, the stator is connected to a grid; a predefined stator current corresponds to the stator current under normal grid conditions before a Low-Voltage Ride Through situation occurs; and the control unit controls the rotor current in order to stabilize the grid in case of a Low-Voltage Ride Through situation by counteracting deviations between the actual stator current and the predefined stator current with respect to a first frequency and a second frequency. The first frequency is a function of the actual rotational velocity of the rotor and the pole pair number of the machine, and the second frequency is a function of the difference between the first frequency and the frequency of the grid.

Other features which are considered as characteristic for the invention are set forth in the appended claims.

Although the invention is illustrated and described herein as embodied in systems containing a double fed induction machine and a fly wheel, and methods of operating such systems, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

In order that the manner in which the above-recited and other advantages of the invention are obtained will be readily understood, a more particular description of the invention briefly described above will be rendered by reference to specific embodiments thereof which are illustrated in the appended drawings. Understanding that these drawings depict only typical embodiments of the invention and are therefore not to be considered to be limiting of its scope, the invention will be described and explained with additional specificity and detail by the use of the accompanying drawings.

BRIEF DESCRIPTION OF THE SEVERAL VIEWS OF THE DRAWING

FIG. 4 is a graph showing in an exemplary fashion three phase currents of a three-phase rotor current, if a voltage drop from a nominal stator voltage occurs.

DETAILED DESCRIPTION OF THE INVENTION

The preferred embodiments of the present invention will be best understood by reference to the drawings. It will be readily understood that the present invention, as generally described and illustrated in the figures herein, could vary in a wide range. Thus, the following more detailed description of the exemplary embodiments of the present invention, as represented in the figures, is not intended to limit the scope of the invention, as claimed, but is merely representative of presently preferred embodiments of the invention.

Figure 1:
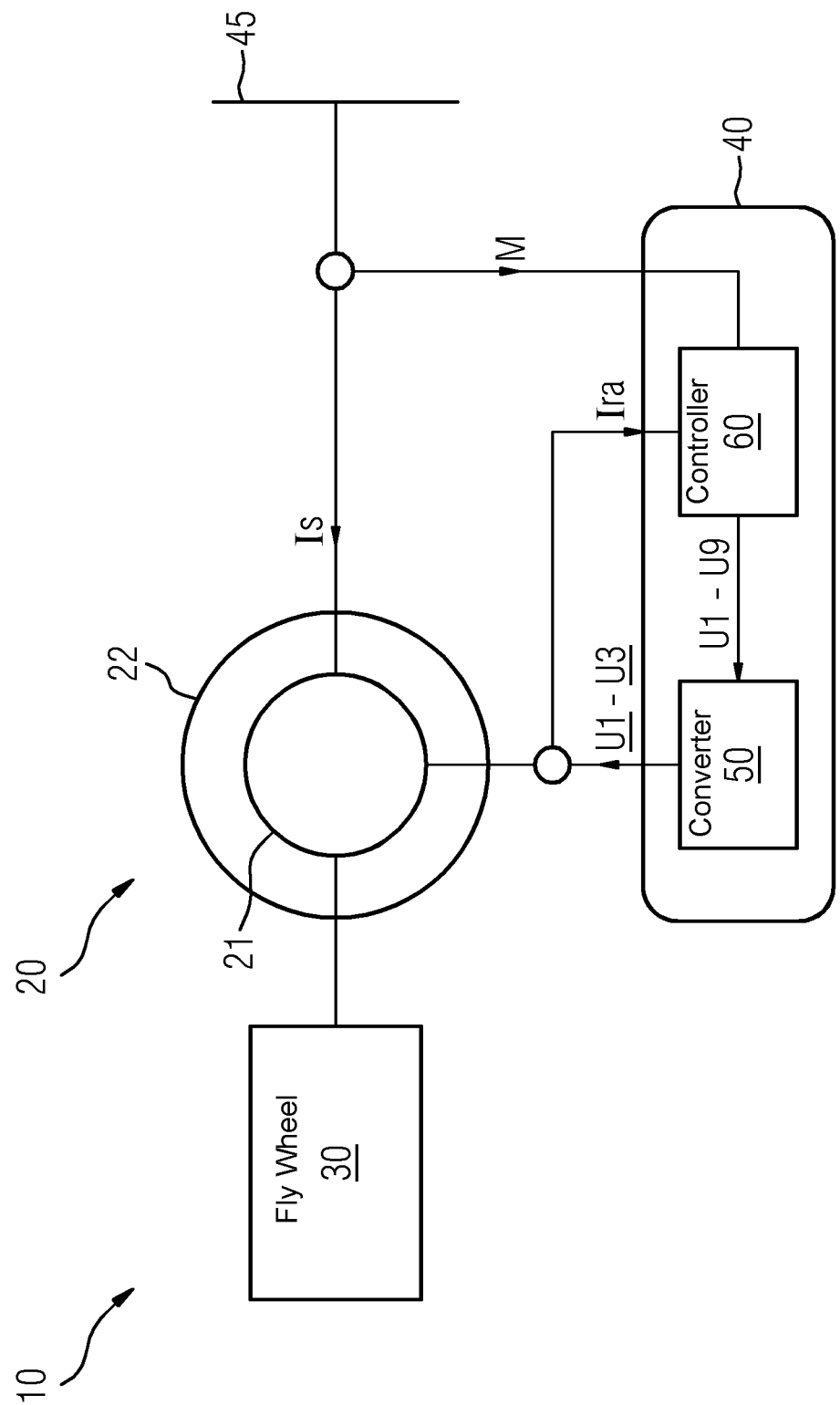
FIG. 1 is an illustration of an exemplary embodiment of a system according to the present invention.

Referring now to the figures of the drawings in detail and first, particularly to FIG. 1 thereof, there is shown an exemplary embodiment of a system 10 according to the present invention. The system 10 forms an asynchronous condenser and contains a double fed induction machine 20, a fly wheel 30 coupled to a rotor 21 of the induction machine 20, and a control device 40 for providing a rotor voltage and a rotor current to the rotor 21 of the induction machine 20. To this end, the control device 40 is connected to the rotor 21 and a stator 22 and generates the phase voltages U1-U3 that are applied to the rotor 21 in response to an electrical signal M that is applied to the stator 22. The stator 22 is connected to an energy supply grid 45. The electrical signal M describes the stator current Is and is preferably proportional to the stator current Is that is provided by the grid 45.

The control device 40 contains a multilevel converter 50 and a control unit 60 for controlling the multilevel converter 50. The multilevel converter 50 is preferably a nine branch Matrix Multilevel Converter.

Figure 2:
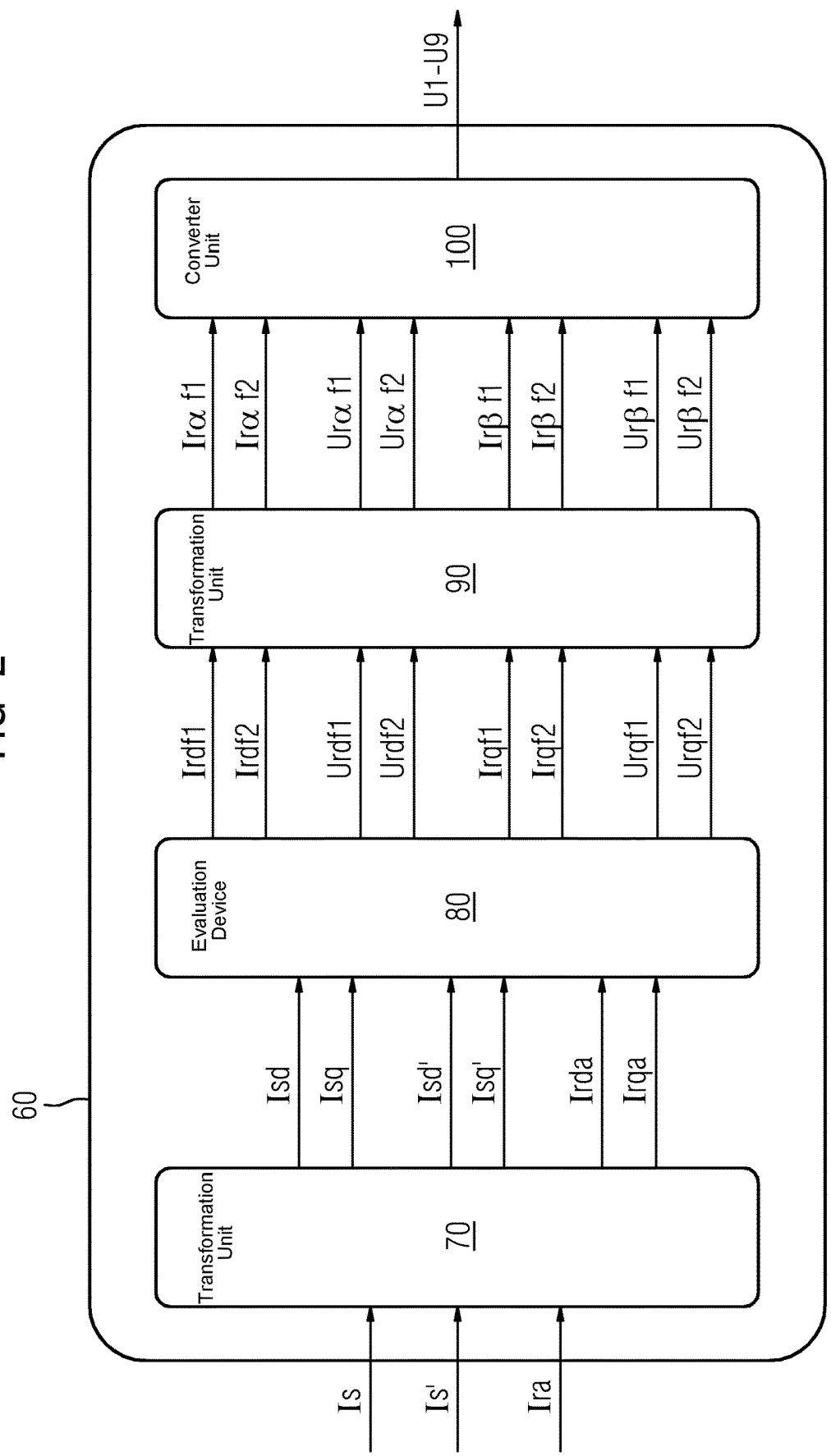
FIG. 2 is an illustration of an exemplary embodiment of a control unit depicted in FIG. 1 in further detail.

FIG. 2 shows an exemplary embodiment of the control unit 60 of FIG. 1 in further detail.

The control unit 60 contains a first transformation unit 70 that receives measured stator phase current values and calculates a d-component Isd and a q-component Isq of the actual stator current Is in Park-coordinates. The first transformation unit 70 also receives measured rotor phase current values and calculates a d-component Irda and a q-component Irqa of the actual rotor current Ira in Park-coordinates. Is' describes a predefined stator current that preferably corresponds to the stator current under normal grid conditions of the grid 45 before a Low-Voltage Ride Through situation occurs. Isd' and Isq' describe the corresponding d-component and q-component of the predefined stator current Is' that are generated by the first transformation unit 70.

In view of its functionality, the first transformation unit 70 may also be called a 3Phase-Park-transformation unit.

An evaluation unit 80 is connected to the first transformation unit 70 and configured to generate d-components and q-components Irdf1, Irdf2, Irqf1, Irqf2, Urdf1, Urdf2, Urqf1, Urqf2 of a rotor current and a rotor voltage that are to be applied to the rotor 21, namely with respect to a first frequency f1 and a second frequency f2 and in response to a deviation between the d-component Isd of the actual stator current Is and the corresponding d-component Isd' of the predefined stator current Is' and the deviation between the q-component Isq of the actual stator current Is and the corresponding q-component Isq' of the predefined stator current Is'.

The control unit 60, for instance its evaluation unit 80, calculates the first frequency f1 as a function of the actual rotational velocity of the rotor 21, preferably as follows:

$$f1 = p\omega m$$

wherein f1 designates the first frequency, p the pole pair number of the machine 20 and ωm the rotational velocity of the rotor 21.

The control unit 60, for instance its evaluation unit 80, calculates the second frequency f2 as a function of the first frequency f1 and the frequency of the electrical signal M that is applied to the stator 22, preferably as follows:

$$f2 = fs - f1$$

wherein f2 designates the second frequency and fs the fundamental frequency of the grid 45 and therefore the fundamental frequency of the electrical signal M that is applied to the stator 22. The second frequency f2 can also be called slip frequency because it describes the deviation between the grid frequency and the rotational frequency of the machine 20.

The output signals of the evaluation unit 80 are transformed by a second transformation unit 90 of the control unit 60. The second transformation unit 90 is configured to receive the d-components and q-components of the rotor current and the rotor voltage that are to be applied to the rotor 21, and to generate corresponding α-components and β-components in Clarke-coordinates. In view of its functionality, the second transformation unit 90 may also be called a Park-Clarke transformation unit.

The control unit 60 further contains a converter unit 100 that is configured to control the branch voltages U1-U9 of the internal branches of the multilevel converter 50 in response to the α-components and β-components that are provided by the second transformation unit 90. In the embodiment of FIGS. 1 and 2, it is assumed that the multilevel converter 50 comprises nine internal branches and therefore requires nine branch voltages U1-U9.

Figure 3:
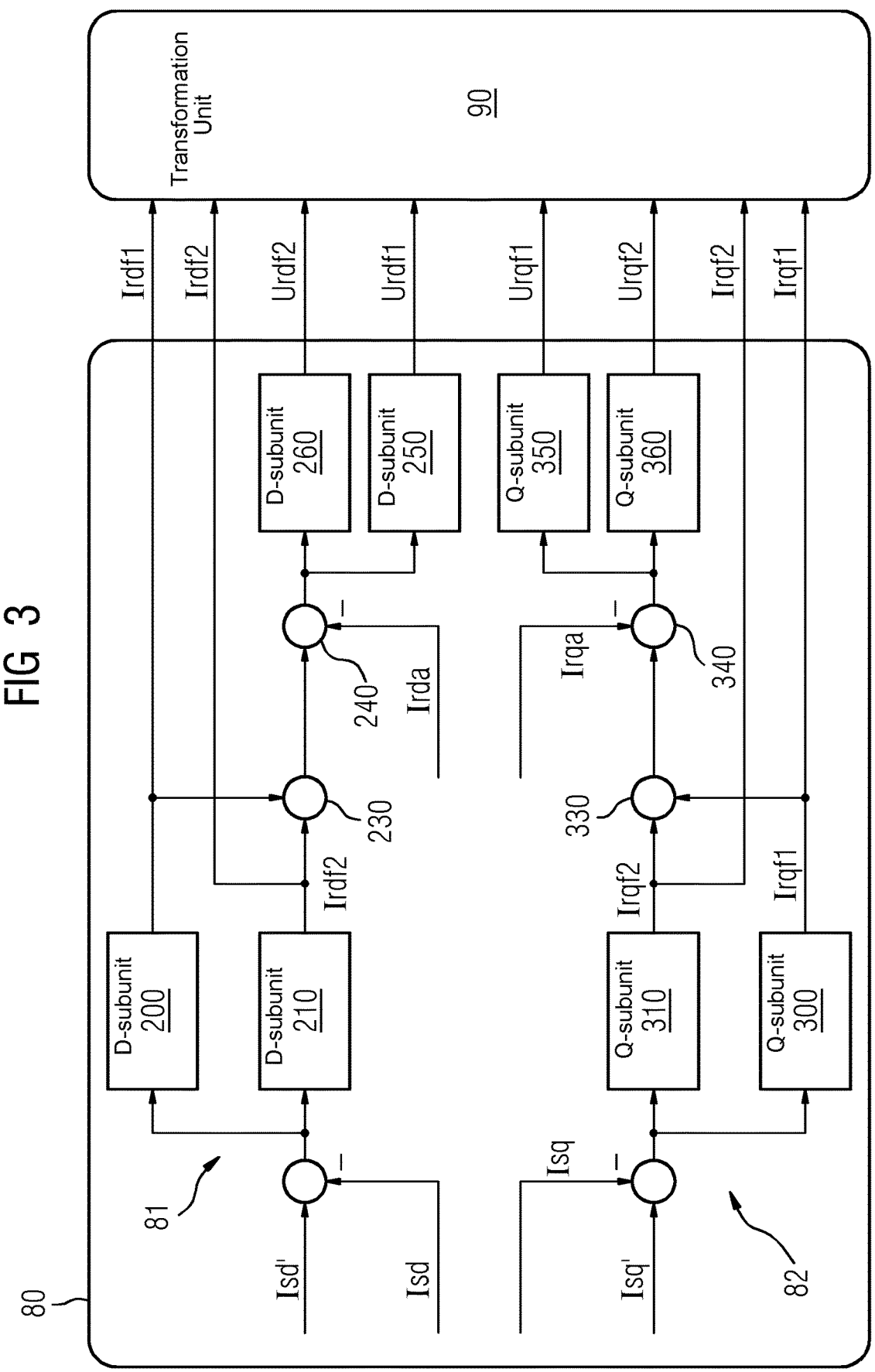
FIG. 3 is an illustration of an exemplary embodiment of an evaluation unit.

FIG. 3 shows an exemplary embodiment of the evaluation unit 80 of FIG. 2 in further detail.

The evaluation unit 80 may comprise a first evaluation branch 81 and a second evaluation branch 82.

The first evaluation branch 81 generates the d-components Ird and Urd of the rotor current Ir and the rotor voltage Ur that are to be applied to the rotor 21, in response to and in order to minimize a deviation between the d-component Isd of the actual stator current Is and the d-component Isd' of the predefined stator current Is', for both the first frequency f1 and the second frequency f2.

The second evaluation branch 82 generates the q-components Irq and Urq of the rotor current Ir and the rotor voltage Ur that are to be applied to the rotor 21, in response to and in order to minimize a deviation between the q-component Isq of the actual stator current Is and the q-component Isq' of the predefined stator current Is', for both the first frequency f1 and the second frequency f2.

The first evaluation branch 81 may comprise a first d-subunit 200 that is configured to generate the d-component Irdf1 of the rotor current Ir that is to be applied to the rotor 21, in response to a deviation between the d-component Isd of the actual stator current Is and the d-component Isd' of the predefined stator current Is' with respect to the first frequency f1.

A second d-subunit 210 of the first evaluation branch 81 generates the d-component Irdf2 of the rotor current Ir that is to be applied to the rotor 21, in response to a deviation between the d-component Isd of the actual stator current Is and the d-component Isd' of the predefined stator current Is' with respect to the second frequency f2.

A d-adder 230 of the first evaluation 81 branch adds the generated d-components Irdf1 and Irdf2 of the first and second frequency f1 and f2 and generates a d-component Ird of the sum current Ir that is to be applied to the rotor 21.

A d-subtractor 240 of the first evaluation branch 81 subtracts the d-component Irda of the actual rotor current Ira from the output of the d-adder 230.

A third d-subunit 250 of the first evaluation branch 81 generates the d-component Urdf1 of the rotor voltage Ur that is to be applied to the rotor 21, in response to the output of the d-subtractor 240 with respect to the first frequency f1.

A fourth d-subunit 260 of the first evaluation branch 81 generates the d-component Urdf2 of the rotor voltage Ur that is to be applied to the rotor 21, in response to the output of the d-subtractor 240 with respect to the second frequency f2.

The second evaluation branch 82 comprises a first q-subunit 300 that generates the q-component Irqf1 of the rotor current Ir that is to be applied to the rotor 21, in response to a deviation between the q-component Isq of the actual stator current Is and the q-component Isq' of the predefined stator current Is' with respect to the first frequency f1.

A second q-subunit 310 of the second evaluation branch 82 generates the q-component Irqf2 of the rotor current Ir that is to be applied to the rotor 21, in response to a deviation between the q-component Isq of the actual stator current Is and the q-component Isq' of the predefined stator current Is' with respect to the second frequency f2.

A q-adder 330 of the second evaluation branch 82 adds the generated q-components Irqf1 and Irqf2 of the first and second frequency and generates a q-component Irq that is to be applied to the rotor 21.

A q-subtractor 340 of the second evaluation branch 82 subtracts the q-component Irqa of the actual rotor current Ira from the output of the gadder 330.

A third q-subunit 350 of the second evaluation branch 82 generates the q-component Urqf1 of the rotor voltage Ur that is to be applied to the rotor 21, in response to the output of the q-subtractor 340 with respect to the first frequency f1.

A fourth q-subunit 360 of the second evaluation branch 82 generates the q-component Urqf2 of the rotor voltage Ur that is to be applied to the rotor 21, in response to the output of the q-subtractor 340 with respect to the second frequency f2.

The first and third d-subunit as well as the first and third q-subunit are preferably resonant controllers.

Resonant controller is implemented to generate controlled variable for additional frequency generated by grid failure like voltage drop.

The second and fourth d-subunit as well as the second and fourth q-subunit are preferably PI-controllers.

Regular PI controller is used to generate a controlled variable for normal frequency.

As explained above, the control unit 60 controls the multilevel converter 50 in order to apply a rotor voltage that comprises both the first and second frequency f1 and f2, in order to counteract deviations between the actual stator current Is and the predefined stator current Is' (i.e. the stator current under normal grid conditions before a Low-Voltage Ride Through situation occurs) in order to handle Low-Voltage Ride Through situations.

For instance, in case of a grid voltage drop, the control device 40 may support the grid 45 by injecting a controlled reactive power into the grid without considerable harmonics. This will be explained further below in connection with a prior art approach that is disclosed in "Systemanalyse and Regelung des Modularen Multilevel Matrix Umrichters als Antriebsumrichter" (Kammerer, Felix, Dissertation, Karlsruhe, Karlsruher Institut für Technologie (KIT), 2016, Diss., 2016).

FIG. 4 shows in an exemplary fashion the three phase currents of the three-phase rotor current Ir in Kiloampere, if a voltage drop from nominal stator voltage to 9% of the nominal stator voltage occurs at time t=0 s. In response, the control device 40 of FIGS. 1 to 3 delivers a stator reactive current analogue to Qs=120 MVAr at nominal voltage. It can be noticed, that two frequencies f1 and f2 are arising due to the characteristics of the evaluation unit 80. These two frequencies f1 and f2 are fed by the multilevel converter 50 into the rotor terminals of the rotor 21. Since the multilevel converter 50 may comprise at least nine branches with series connected full bridge IGBT modules, it represents a converter with distributed energy storages. The energy symmetry between the converter branches should be ensured by a control approach using circular currents between the branches which do not affect the input currents and output currents.

The control operation carried out by the converter unit 100 of FIG. 2 with respect to the multilevel converter 50 may be based on the prior art document "Systemanalyse and Regelung des Modularen Multilevel Matrix Umrichters als Antriebsumrichter" mentioned above and can be described as cascaded vectorised multi-variable control.

The exemplary embodiment of the invention as discussed above with reference to FIGS. 1-3 may be based on a combination of:

(a) a control of the multilevel converter 50 (carried out by the converter unit 100 of FIG. 2) that is similar or identical to the control according to the above mentioned thesis "Systemanalyse and Regelung des Modularen Multilevel Matrix Umrichters als Antriebsumrichter", and (b) a stator current oriented control of the converter unit 100 based on the output signals that are provided by the PI controllers and the resonant controllers which are incorporated in the evaluation unit 80 of FIG. 2.

Since the evaluation unit 80 handles the two rotor frequencies f1 and f2 with PI controllers and resonant controllers separately, the rotor current and the rotor voltage can be used by the converter unit 100 without any additional effort for separation of the output current frequencies or the output voltage frequencies.

The control approach according to the exemplary embodiment of the invention as discussed above with reference to FIGS. 1-3 preferably has one or more of the following novel features listed below.

Utilization of stator voltage oriented control with resonant controllers for intrinsic extraction of the needed frequencies for control of the multilevel converter 50.

Utilizing the dominant power component arising from the interaction of the high induced rotor voltage component with the circular currents for energy pulsation reduction.

With the new control approach, the control device 40 is capable of driving through voltage dips and support the grid 45 by injecting reactive power.

The various embodiments and aspects of embodiments of the invention disclosed herein are to be understood not only in the order and context specifically described in this specification, but to include any order and any combination thereof. Whenever the context requires, all words used in the singular number shall be deemed to include the plural and vice versa. Whenever the context requires, all options that are listed with the word "and" shall be deemed to include the world "or" and vice versa, and any combination thereof.

In the drawings and specification, there have been disclosed a plurality of embodiments of the present invention. The applicant would like to emphasize that each feature of each embodiment may be combined with or added to any other of the embodiments in order to modify the respective embodiment and create additional embodiments. These additional embodiments form a part of the present disclosure and, therefore, the applicant may file further patent claims regarding these additional embodiments at a later stage of the prosecution.

Further, the applicant would like to emphasize that each feature of each of the following dependent claims may be combined with any of the present independent claims as well as with any other (one or more) of the present dependent claims (regardless of the present claim structure). Therefore, the applicant may direct further patent claims towards other claim combinations at a later stage of the prosecution.

REFERENCE SIGNS 10 system
20 induction machine
21 rotor
22 stator
30 fly wheel
40 control device
45 energy supply grid
50 multilevel converter
60 control unit
70 first transformation unit
80 evaluation unit
81 first evaluation branch
82 second evaluation branch
90 second transformation unit
100 converter unit
200 first d-subunit
210 second d-subunit
230 d-adder
240 d-subtractor
250 third d-subunit
260 fourth d-subunit
300 first q-subunit
310 second q-subunit
330 q-adder
340 q-subtractor
350 third q-subunit
360 fourth q-subunit
f1 first frequency
f2 second frequency
Ir rotor current
Ira actual rotor current
Ird d-component of the rotor current
Irda d-component of the actual rotor current
Irdf1 d-component of the rotor current with respect to the first frequency
Irdf2 d-component of the rotor current with respect to the second frequency
Irqa q-component of the actual rotor current
Irqf1 q-component of the rotor current with respect to the first frequency
Irqf2 q-component of the rotor current with respect to the second frequency
Is actual stator current
Isd d-component of the actual stator current
Isq q-component of the actual stator current
Is' predefined stator current
Isd' d-component of the predefined stator current
Isq' q-component of the predefined stator current
M electrical signal
t time
U1-U3 phase voltages
U1-U9 branch voltages
Ur rotor voltage
Urdf1 d-component of the rotor voltage with respect to the first frequency
Urdf2 d-component of the rotor voltage with respect to the second frequency
Urqf1 q-component of the rotor voltage with respect to the first frequency
Urqf2 q-component of the rotor voltage with respect to the second frequency
α Clarke-coordinates
β Clarke-coordinates

The invention claimed is:

1. A system, comprising:
a double fed induction machine having a stator and a rotor, said stator being connected to an energy supply grid;
a fly wheel coupled to said rotor; and
a control system for providing a rotor voltage and a rotor current to said rotor, said control system connected to said rotor and said stator and capable of generating the rotor voltage and the rotor current in response to an electrical signal that is applied to said stator, said control system having a multilevel converter and a controller for controlling said multilevel converter;
said controller being configured for calculating a first frequency in dependence on an actual rotational velocity of said rotor, the first frequency being dependent on the actual rotational velocity of said rotor and a pole pair number of said double fed induction machine;
said controller being configured for calculating a second frequency in dependence on the first frequency and a frequency of the electrical signal that is applied to said stator, the second frequency being dependent on a difference between the first frequency and a frequency of the energy supply grid;
said controller being configured for controlling said multilevel converter for applying the rotor voltage and the rotor current that each comprise both the first and second frequencies, for counteracting deviations between an actual stator current and a predefined stator current, the predefined stator current corresponding to a stator current under normal grid conditions before a Low-Voltage Ride Through situation occurs;

said controller being configured for controlling the rotor current for stabilizing the energy supply grid in case of the Low-Voltage Ride Through situation by counteracting deviations between the stator current and the predefined stator current with respect to the first frequency and the second frequency.

2. The system according to claim 1, wherein said multilevel converter is a Matrix Multilevel Converter.

3. The system according to claim 1, wherein:
said controller calculates the first frequency by multiplying the
actual rotational velocity of the rotor and a pole pair number of said double fed induction machine; and
said controller calculates the second frequency by subtracting the first frequency from a fundamental frequency of the electrical signal that is applied to said stator.

4. The system according to claim 1, wherein said controller has a transformation unit that is configured to receive measured stator phase current values and calculate a d-component and a q-component of the actual
stator current in Park-coordinates and to receive measured rotor phase current values and calculate a d-component and a q-component of an actual rotor
current in Park-coordinates.

5. The system according to claim 4, wherein:
said controller contains an evaluator that is configured to generate d-components and q-components of the rotor current and the rotor voltage that are to be applied to said rotor, namely:
with respect to the first frequency and the second frequency; and
in response to a deviation between the d-component of the actual stator current and a corresponding d-component of a predefined stator current and a deviation between the q-component of the actual stator current and a corresponding q-component of the predefined stator current.

6. The system according to claim 1, wherein said controller contains a transformation unit configured to receive d-components and q-components of the rotor current and the rotor voltage that are to be applied said rotor, and to generate corresponding α-components and β-components in Clarke-coordinates.

7. The system according to claim 6, wherein said controller contains a converter unit configured to control branch voltages of internal branches of said multilevel converter in response to the α-components and the β-components that define the rotor current and the rotor voltage that are to be applied to rotor.

8. A system, comprising:
a double fed induction machine having a stator and a rotor;
a fly wheel coupled to said rotor; and
a control system for providing a rotor voltage and a rotor current to said rotor, said control system connected to said rotor and said stator and capable of generating the rotor voltage and the rotor current in response to an electrical signal that is applied to said stator, said control system having a multilevel converter and a controller for controlling said multilevel converter;
said controller being configured for calculating a first frequency in dependence on an actual rotational velocity of said rotor;
said controller being configured for calculating a second frequency in dependence on the first frequency and a frequency of the electrical signal that is applied to said stator;
said controller being configured for controlling said multilevel converter for applying the rotor voltage and the rotor current that each comprise both the first and second frequencies, for counteracting deviations between an actual stator current and a predefined stator current;
said controller having a transformation unit being configured for receiving measured stator phase current values and calculating a d-component and a q-component of the actual stator current in Park-coordinates and for receiving measured rotor phase current values and calculating a d-component and a q-component of an actual rotor current in Park-coordinates;
said controller containing an evaluator being configured for generating d-components and q-components of the rotor current and the rotor voltage that are to be applied to said rotor, namely:
with respect to the first frequency and the second frequency; and
in response to a deviation between the d-component of the actual stator current and a corresponding d-component of a predefined stator current and a deviation between the q-component of the actual stator current and a corresponding q-component of the predefined stator current;
said evaluator containing a first evaluation branch and a second evaluation branch;
said first evaluation branch being configured generating the d-components of the rotor current and the rotor voltage that are to be applied to said rotor, in response to and in order to minimize the deviation between the d-component of the actual stator current and the d-component of the predefined stator current; and
said second evaluation branch being configured generating the q-components of the rotor current and the rotor voltage that are to be applied to the rotor, in response to and in order to minimize the deviation between the q-component of the actual stator current and the q-component of the predefined stator current.

9. The system according to claim 8, wherein said first evaluation branch has:
a first d-subunit configured to generate the d-component of the rotor current that is to be applied to said rotor, in response to the deviation
between the d-component of the actual stator current and the d-component of the predefined stator current with respect to the first frequency;
a second d-subunit configured to generate the d-component of the rotor current that is to be applied to said rotor, in response to the deviation between the d-component of the actual stator current and the d-component of the predefined stator current with respect to the second frequency;
a d-adder that adds generated d-components of the first and second frequencies and generates a d-component of a sum current;
a d-subtractor that is configured to subtract the d-component of the actual rotor current from the d-component of the sum current;
a third d-subunit configured to generate the d-component of the
rotor voltage that is to be applied to the rotor, in response to the output of the d-subtractor with respect to the first frequency; and a fourth d-subunit that is configured to generate the d-component of the rotor voltage that is to be applied to said rotor, in response to the output of the d-subtractor with respect to the second frequency.

10. The system according to claim 9, wherein said second evaluation branch contains:

a first q-subunit configured to generate the q-component of the rotor current that is to be applied to said rotor, in response to the deviation between the q-component of the actual stator current and the q-component of the predefined stator current with respect to the first frequency;

a second q-subunit configured to generate the q-component of the rotor current that is to be applied to said rotor, in response to the deviation between the q-component of the actual stator current and the q-component of the predefined stator current with respect to the second frequency;

a q-adder that adds the generated q-components of the first and second frequencies and generates a q-component of a sum current;

a q-subtractor configured to subtract the q-component of the actual rotor current from the q-component of the sum current;

a third q-subunit configured to generate the q-component of the rotor voltage that is to be applied to said rotor, in response to an output of the q-subtractor with respect to the first frequency; and a fourth q-subunit that is configured to generate the q-component of the rotor voltage that is to be applied to said rotor, in response to said output of the q-subtractor with respect to the second frequency.

11. The system according to claim 10, wherein:

said first and third d-subunits are resonant controllers;

said second and fourth d-subunits are PI-controllers; and/or said first and third q-subunits are resonant controllers; and said second and fourth q-subunits are PI-controllers.

12. A method of operating a system having a double fed induction machine with a stator and a rotor, a fly wheel coupled to the rotor and a control system for providing a rotor voltage and a rotor current to the rotor, the control system being connected to the rotor and the stator and generating the rotor voltage and the rotor current in response to an electrical signal applied to the stator, which comprises the steps of:

providing the control system with a multilevel converter and the multilevel converter being controlled by a controller;

connecting the stator to a grid, a predefined stator current corresponding to a stator current under normal grid conditions before a Low-Voltage Ride Through situation occurs; and controlling, via the controller, the rotor current in order to stabilize the grid in case of the Low-Voltage Ride Through situation by counteracting deviations between an actual stator current and a predefined stator current with respect to a first frequency and a second frequency, the first frequency being dependent on an actual rotational velocity of the rotor and a pole pair number of the double fed induction machine, and the second frequency being dependent on a difference between the first frequency and a frequency of the grid.

* * * * *